United States Patent [19]
Graf

[11] Patent Number: 5,878,907
[45] Date of Patent: Mar. 9, 1999

[54] CONTAINER

[76] Inventor: Otto Peter Graf, Mozartstrasse 25, Emmendingen, Germany, D-79312

[21] Appl. No.: 52,548

[22] Filed: Mar. 31, 1998

[30] Foreign Application Priority Data

Apr. 11, 1997 [EP] European Pat. Off. .............. 97105987

[51] Int. Cl.⁶ .................................................. B65D 45/16
[52] U.S. Cl. ........................ 220/324; 220/4.24; 220/4.33
[58] Field of Search ..................................... 220/324, 683, 220/4.21, 684, 4.24, 4.25, 4.28, 4.33, 622, 693, 315; 215/273, 281

[56] References Cited

U.S. PATENT DOCUMENTS

| 78,072 | 5/1868 | Dean ........................................ 220/684 |
| 80,800 | 8/1868 | Bennett .................................. 220/684 |
| 223,792 | 10/1880 | Murphin ................................. 215/281 |
| 3,072,285 | 1/1963 | Aileo . |
| 3,101,154 | 8/1963 | Herdering . |
| 3,244,311 | 4/1966 | Lawson ................................. 220/4.21 |
| 4,034,896 | 7/1977 | Wilson . |
| 4,040,372 | 8/1977 | Flanders . |
| 4,556,150 | 12/1985 | Ikumi .................................... 220/683 |
| 5,222,619 | 6/1993 | Gregory ................................ 220/324 |
| 5,555,995 | 9/1996 | Galer .................................... 220/324 |

FOREIGN PATENT DOCUMENTS

| 0 011 252 | 5/1980 | European Pat. Off. . |
| 94 16 968.3 | 10/1994 | Germany . |
| 677395 | 5/1991 | Switzerland . |

OTHER PUBLICATIONS

Plastics Technical Dictionary; A.M. Wittfoht; Carl Hanser Verlag München Wien 1981; p. 495 and Pipe Saddle.

Primary Examiner—Stephen Castellano
Attorney, Agent, or Firm—Merchant, Gould, Smith, Edell, Welter & Schmidt

[57] ABSTRACT

The container consists of two shells which face each other and are mounted to each other at their port edges by means of wedge type fastener structures. To this end each shell includes a plurality of semi-wedges arranged distributed along the circumference. Two opposite semi-wedges of the two shells complete themselves to a complete wedge. A separately provided wedge clams is slid over every complete wedge, which wedge clamp grips around the complete wedge and presses the two semi-wedges of each complete wedge and accordingly the two port edges together.

9 Claims, 3 Drawing Sheets

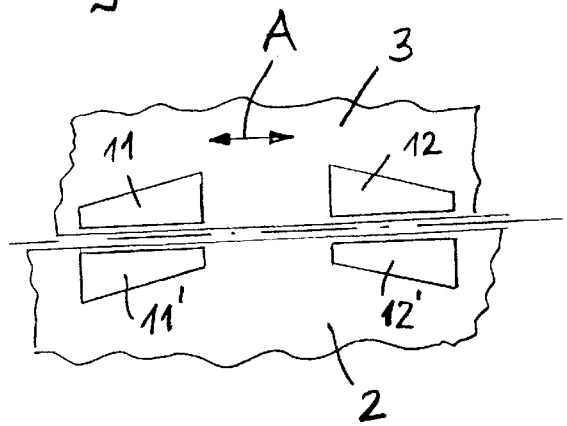
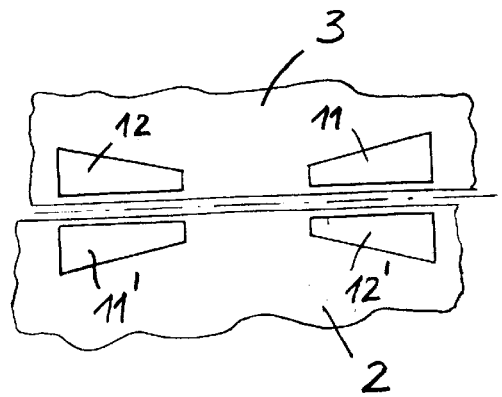
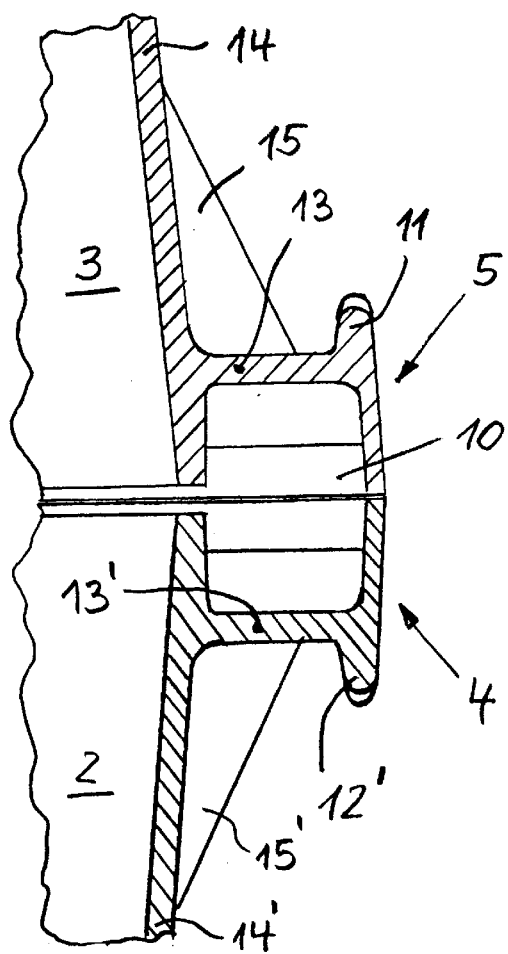
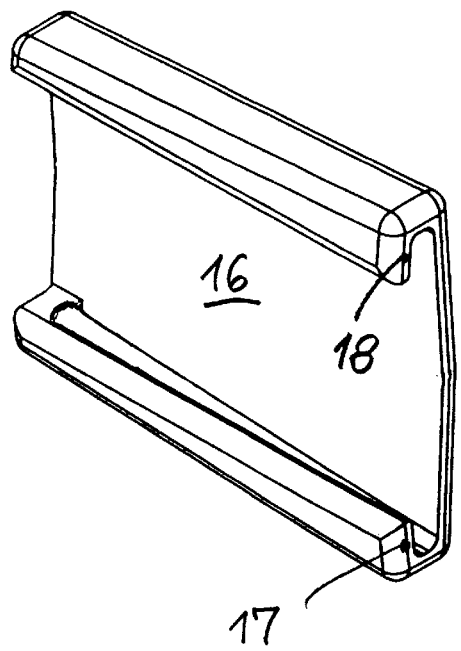

CONTAINER

BACKGROUND OF THE INVENTION

1. Field of the Invention

The invention relates to a container having a lower shell with an upper port edge, and having an upper shell with a lower port edge, and having coupling structures by means of which the two shells are coupled along their port edges, which container features a longitudinal axis which is common to both shells, which longitudinal axis extends vertically when the container is in its operational position.

2. Description of the Prior Art

Such a container is disclosed in the German Utility Model Specification No. 94 16 968. The coupling structures which are disclosed in mentioned specification are threaded bolt structures or such disconnectable couplings which need a plurality of holes (bore holes) which are arranged distributed along the circumference of the shell edges, such as can be seen in FIG. 2 of mentioned Utility Model Specification. This plurality of holes distributed along the circumference is a drawback. At the one hand these holes must be drilled and, at the other hand, coupling members (threaded bolts) must thereafter be inserted into all of these holes. Because commonly a metal is used for such coupling members, there exists the danger of corrosion. A bolting together of the two shells for forming the complete container has, therefore, a number of drawbacks which shall be eliminated by the present invention.

Coupling members which make use of wedges and wedge clamps are known to be used at pipe sockets (CH-PS 677 395 and EU-publication 0 011 252). This prior art discloses a coupling of two channel shaped sections of a pipe which are coupled to form a complete pipe (socket). The two socket half shells differ, from each other, however, so that when assembled to a complete socket a complete wedge is formed at either side of the socket.

The U.S. Pat. No. 5,222,619 discloses a container with a cover lid in which wedge clamps are arranged between the container and the lid in order to fasten the lid onto the container. The container and lid are two separate structures.

SUMMARY OF THE INVENTION

A general object of the invention is to provide a container of which the upper shell and the lower shell are identical. A further object of the invention is to provide a container having a lower shell with a upper port edge and a upper shell with a lower port edge, and having coupling structures by means of which the two shells are coupled along their port edges, which container features a longitudinal axis which is common to both shells, which longitudinal axis extends vertically when the container is in its operational position, wherein both port edges comprise a plurality of semi-wedges located distributed along their circumferences, further wherein the semi-wedges of both shells complete each other to form complete wedges, which container includes, furthermore, separate wedge clamps of which each is adapted to be slid over one complete wedge in order to press the two semi-wedges and accordingly the two shells together, and wherein the semi-wedges located distributed along the circumferences of the port edges alternate with regard to their direction of incline, whereby the direction of the fastening movement of said separate wedge clamps is directed alternatingly in the one circumferential direction and in the opposite circumferential direction of the port edges.

Accordingly, the container structured in accordance with the invention features the considerable advantage that the upper shell and lower shell can be of an identical design.

BRIEF DESCRIPTION OF THE DRAWINGS

The invention will be better understood and objects other than those set forth above will become apparent when consideration is given to the following detailed description thereof. Such description makes reference to the annexed drawings, wherein:

FIG. 3 is a schematic illustration of a cut-out of both shells, in a position in which they can not be coupled together;

FIG. 4 is a illustration similar to FIG. 3, but in a position of the two shells in which they can be coupled together;

FIG. 5 is a section along line V—V of FIG. 1, without any wedge clamp; and

FIG. 6 is a schematic view of a wedge clamp.

DETAILED DESCRIPTION OF A PREFERRED EMBODIMENT

Figure 1:
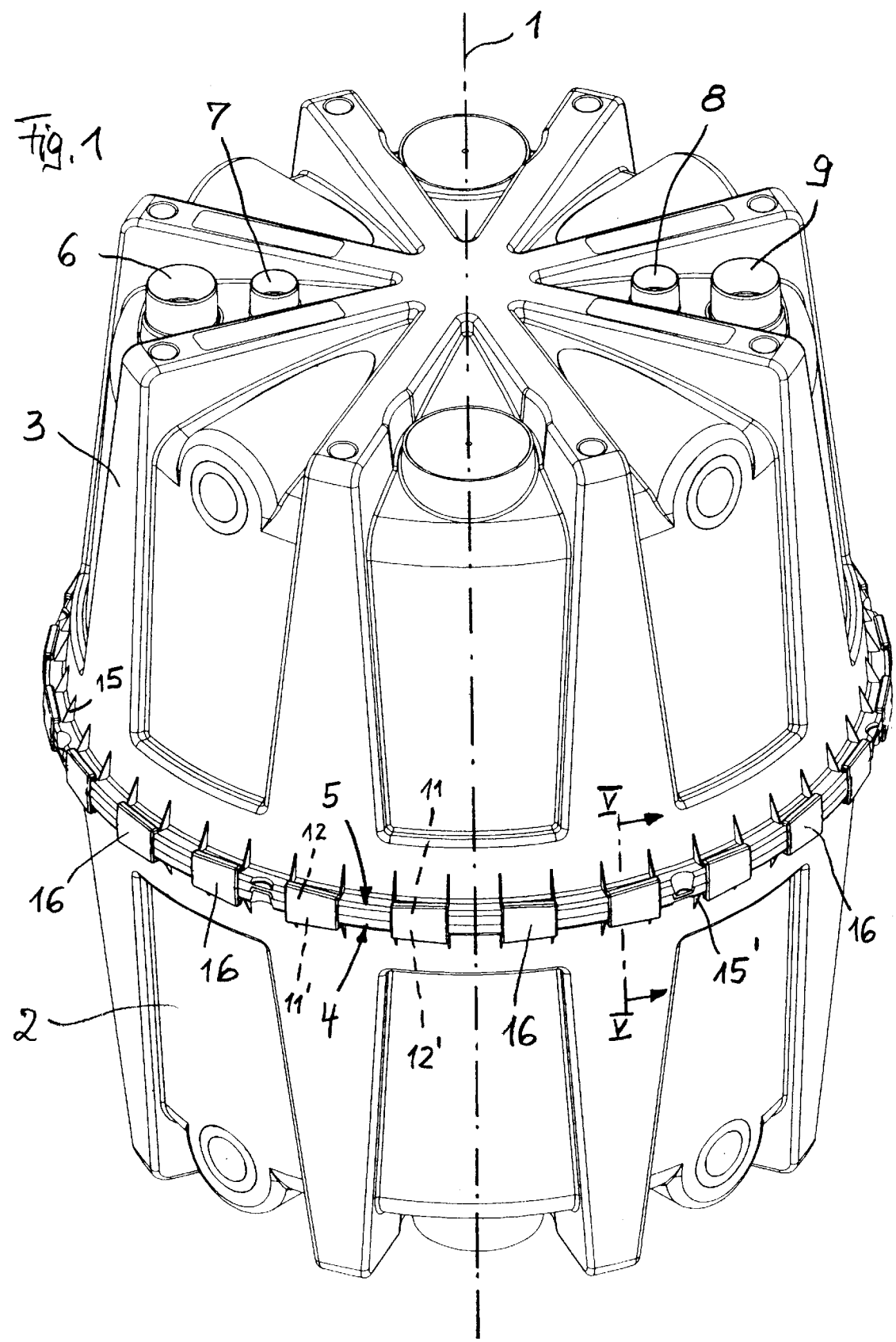
FIG. 1 illustrates a perspective view of a container.

The container is illustrated in FIG. 1 in its operational position according to which the longitudinal axis 1 extends vertically. The container has a lower shell 2 and an upper shell 3. The lower shell 2 has an upper port edge 4 and the upper shell 3 has a lower port edge 5. The two shells 2 and 3 face each other at their port edges 4 and 5 and abut each other by these port edges 4 and 5 via not illustrated sealing means (FIGS. 1, 5).

The two shells 2 and 3 consist of a plastic material and are produced by injection molding. As a plastic material High Density Polyethylene (HDPE) and also Polypropylene-Copolymeres (PPC) have been proven to be useful. At the example illustrated in FIG. 1 the upper shell 3 is equipped with connecting stubs 6–9 for conduits. The lower shell 3 may be equipped with the same connection stubs which, however, are not illustrated. Because the container commonly serves for a receiving of rain water as water tank the two shells 2 and 3 must be able to be coupled together in a water tight manner. As is common, the not illustrated sealing means are placed into a space 10 between the two port edges 4 and 5.

Figure 2:
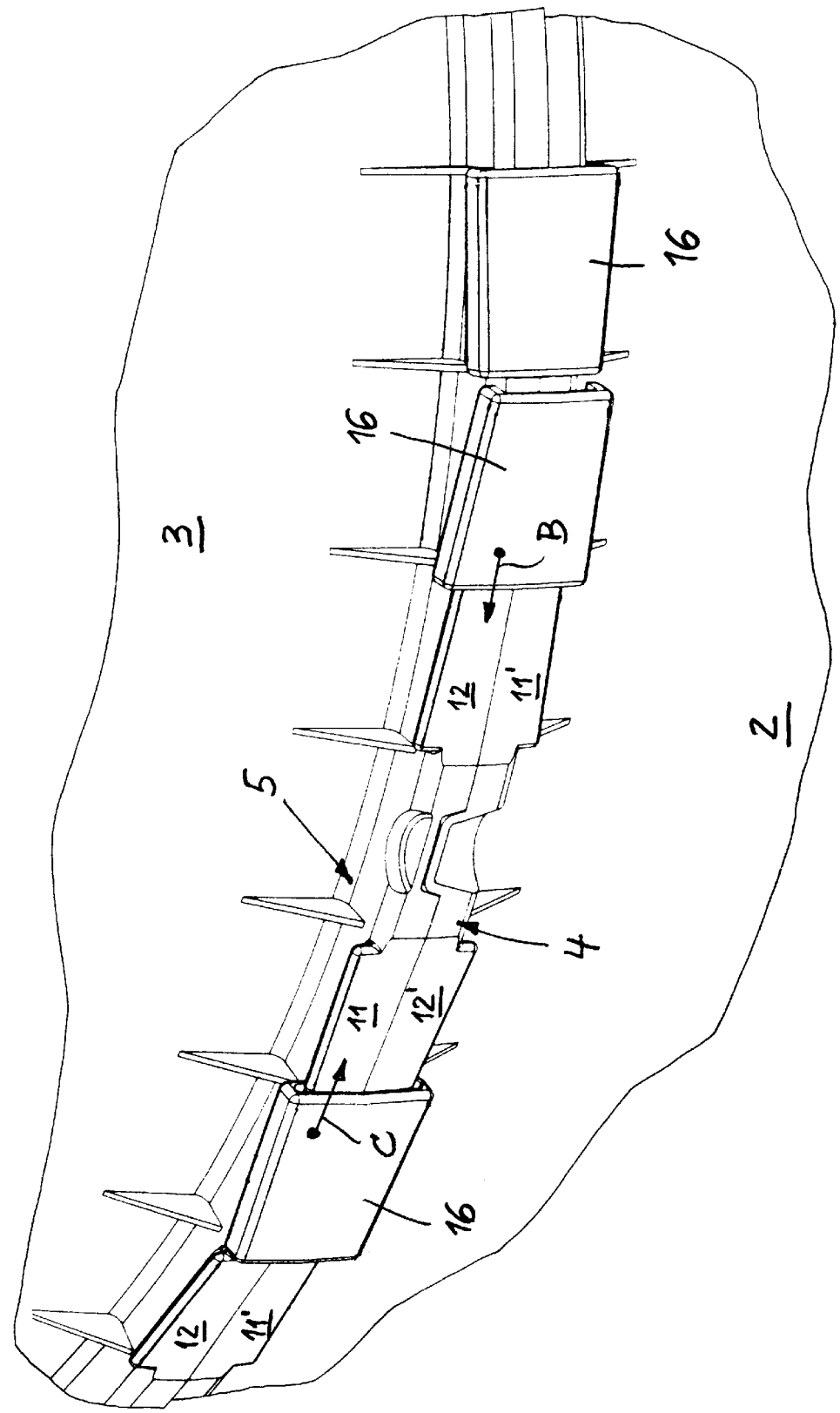
FIG. 2 is a view of a detail of the container shown in FIG. 1 in a partly coupled state, and illustrated on an enlarged scale.

The shell port edge 5 of the upper shell 3 includes a plurality of semi-wedges 11,12 arranged distributed along its circumference. The shell port edge 4 of the lower shell 2 includes identical semi-wedges 11' and 12'. The semi-wedges 11' and 12' which are arranged distributed along the shell port edge 4 alternate with regard to their direction of incline, so that the direction of tightening of the wedges extends once in one circumferential direction and then in the opposite circumferential direction. This can be seen in FIGS. 1–4. The same is true for the semi-wedges 11 and 12 arranged distributed along the circumference of the shell port edge 5 alternate with regard to the direction of their inclination. By this important measure it has become possible that the lower shell 2 and the upper shell 3 are of an identical design such as will be explained further below. As can be seen in FIGS. 1 and 2, each port edges 4 and 5 extends circularly along the circumference of the shell, with the center coinciding with the longitudinal axis 1. As illustrated in FIGS. 1, 2 and 5, the semi-wedges 11,12 of the shell 3 are arranged on a flange 13 and are, therefore, located due to this flange in a radial direction outside of the rest of the wall 14 of the shell. In the same manner the semi-wedges 11' and 12' of the shell 2 are arranged on a flange 13' and are, therefore, located due to this flange in a radial direction outside of the rest of the wall 14' ofd the shell (FIG. 5). At the area of the flanges 13, 13' the shells 2 and 3 are provided with stiffening ribs 15, 15'.

The procedure of assembling the two shells 2 and 3 to a complete container proceeds as follows. When both shells 2 and 3 are of a identical design they thus can be produced on one and the same injection molding tool; are, therefore, two bodies ejected in succession out of the injection molding machine. If now these two identical shells 2, 3 are brought together such that they contact each other at their port edges 4,5, the semi-wedges 11,11' and 12,12' which are identical can be positioned opposite of each other as shown in FIG. 3. In this position the two identical shells 2 and 3 can not be coupled together; a rotating in the direction of the double arrow A in FIG. 3 by one division of the semi-wedges arranged distributed along the circumference is necessary in order to reach the position according to FIG. 4. In FIG. 4, now, the semi-wedges 11', 12 and 11, 12', respectively are located opposite of each other and form a complete wedge 11', 12 or 11, 12', respectively In this position according to FIG. 4 the two shells 2 and 3 can now be coupled together. This is performed by separate wedge clamps 16 which also consist advantageously of a plastic material. Now, such a wedge clamp 16 can be slid over each complete wedge 11', 12 or 11, 12', wherewith the two semi-wedges 11', 12 or 11, 12', respectively are pressed together, so that accordingly the two shells 2 and 3 are pressed together at their port edges 4 and 5. Thus, every wedge clamp 16 is seated with a wedge effect on a complete wedge 11', 12 or 11, 12' and grips around the semi-wedges 11' and 12 or 12' and 11, respectively. In order to be able to grip around the wedge clamp 16 is provided with webs 17 and 18 (FIG. 6). In FIG. 2 two wedge clamps 16 are illustrated before they are driven in the direction of the arrows B and C onto the complete wedges 11', 12 and 11, 12', respectively. One wedge clamp 16 is already in its final mounted state. As can be seen in the FIGS. 1 and 2, the mounted wedge clamps 16 are located on a annular path having its center coinciding with the longitudinal axis 1.

Because the direction of the incline of the semi-wedges arranged distributed along the circumference of the shell port edge in a staggered manner alternate, a large advantage is reached in that the two shells of the container can be of an identical design, thus that they are accordingly two same injection molding products. This means that only one single injection molding tool is needed.

While these is shown and described a present preferred embodiment of the invention it is to be distinctly understood that the invention is not limited thereto, but may be otherwise variously embodied and practiced within the scope of the following claims.

I claim:

1. A container, having a lower shell with an upper port edge, and having an upper shell with a lower port edge, and having coupling structures by means of which the two shells are coupled along their port edges, which container features a longitudinal axis which is common to both shells, which longitudinal axis extends vertically when the container is in its operational position, wherein both port edges comprise a plurality of semi-wedges located distributed along their circumferences, further wherein the semi-wedges of both shells complete each other to form complete wedges, which container includes, furthermore, separate wedge clamps of which each is adapted to be slid over one complete wedge in order to press the two semi-wedges and accordingly the two shells together, and wherein the semi-wedges located distributed along the circumferences of the port edges alternate with regard to their direction of incline, whereby the direction of the fastening movement of said separate wedge clamps is alternatingly in the one circumferential direction and in the opposite circumferential direction of the port edges.

2. The container of claim 1, wherein the lower shell and the upper shell are of an identical design.

3. The container of claim 2, wherein the two identical shells contact each other along their identical port edges and are arranged rotationally staggered around the longitudinal axis common to both shells relative to each other by one graduation of their semi-wedges located distributed along their circumferences, so that any two respective oppositely located semi-wedges complete each other to form a complete wedge.

4. The container of claim 1, wherein each port edge extends circularly along the circumference of the shell whereby the center of the circle is located on the longitudinal axis.

5. The container of claim 1, wherein the upper shell and the lower shell consist of a plastic material and are injection molded products.

6. The container of claim 1, wherein the semi-wedges of each shell are present at a flange and are located due to the flange outside of the rest of the shell wall.

7. The container of claim 1, wherein the lower and the upper shell as well, includes each a connecting stub for a conduit.

8. The container of claim 1, wherein the complete wedges and the wedge clamps which sit on the complete wedges and grip around complete wedges are located on a circular line having its center on the longitudinal axis.

9. The container of claim 1, wherein the clamps consist of a plastic material.

* * * * *

UNITED STATES PATENT AND TRADEMARK OFFICE
CERTIFICATE OF CORRECTION

PATENT NO. : 5,878,907
DATED : MARCH 9, 1999
INVENTOR(S) : GRAF

It is certified that error appears in the above-identified patent and that said Letters Patent is hereby corrected as shown below:

Front Page, [56] References Cited, U.S. Patent Documents: "223,792" should read --233,792--

Signed and Sealed this

Seventeenth Day of April, 2001

Attest:

NICHOLAS P. GODICI

Attesting Officer     Acting Director of the United States Patent and Trademark Office